US 9,703,767 B2

(12) United States Patent
Bedard et al.

(10) Patent No.: US 9,703,767 B2
(45) Date of Patent: Jul. 11, 2017

(54) SPREADSHEET CELL DEPENDENCY MANAGEMENT

(71) Applicants: Jason Bedard, Vancouver (CA); Viren Kumar, Vancouver (CA)

(72) Inventors: Jason Bedard, Vancouver (CA); Viren Kumar, Vancouver (CA)

(73) Assignee: Business Objects Software Limited, Dublin (IE)

( * ) Notice: Subject to any disclaimer, the term of this patent is extended or adjusted under 35 U.S.C. 154(b) by 520 days.

(21) Appl. No.: 13/689,705

(22) Filed: Nov. 29, 2012

(65) Prior Publication Data

US 2014/0149837 A1   May 29, 2014

(51) Int. Cl.
*G06F 17/00* (2006.01)
*G06F 17/24* (2006.01)

(52) U.S. Cl.
CPC .................. *G06F 17/246* (2013.01)

(58) Field of Classification Search
CPC .. G06F 17/246; G06F 17/245; G06F 17/2247; G06F 17/227
See application file for complete search history.

(56) References Cited

U.S. PATENT DOCUMENTS

| | | | |
|---|---|---|---|
| 5,819,102 A | 10/1998 | Reed et al. | |
| 6,256,649 B1 * | 7/2001 | Mackinlay | G06F 17/246 345/473 |
| 6,463,442 B1 * | 10/2002 | Bent | G06F 17/3056 707/999.103 |
| 6,701,485 B1 * | 3/2004 | Igra | G06F 17/246 715/209 |
| 6,766,512 B1 | 7/2004 | Khosrowshahi et al. | |
| 9,009,582 B2 * | 4/2015 | Rochelle | G06F 17/2247 715/212 |
| 2002/0091728 A1 * | 7/2002 | Kjaer | G06F 17/246 715/212 |
| 2003/0169295 A1 | 9/2003 | Becerra | |
| 2005/0044496 A1 * | 2/2005 | Kotler et al. | 715/538 |
| 2005/0268215 A1 * | 12/2005 | Battagin et al. | 715/503 |
| 2006/0112123 A1 | 5/2006 | Clark et al. | |

(Continued)

OTHER PUBLICATIONS

SAP BusinessObjects. Dashboards and Presentation Design User Guide. SAP BusinessObjects 4.0 Support Package 5. Nov. 5, 2012.

(Continued)

*Primary Examiner* — Scott Baderman
*Assistant Examiner* — Matthew G McVicker
(74) *Attorney, Agent, or Firm* — Mintz Levin Cohn Ferris Glovsky and Popeo, P.C.

(57) ABSTRACT

A spreadsheet file and a dashboard structure file characterizing a dashboard are received. These files are then analyzed to determine dependencies. Subsequently, for each determined dependency, an event listener is registered for a dependent component that corresponds to the determined dependency. These event listeners are notified of an event from an event source when a corresponding dependee is changed. Dependent components are then updated using data from a corresponding dependee in response to event notifications so that each updated dependent component can be rendered within the dashboard. Related apparatus, systems, techniques and articles are also described.

17 Claims, 10 Drawing Sheets

(56) References Cited

U.S. PATENT DOCUMENTS

| | | | |
|---|---|---|---|
| 2006/0136386 A1* | 6/2006 | Battagin | H04L 67/36 |
| 2006/0224946 A1* | 10/2006 | Barrett | G06F 17/246 715/210 |
| 2007/0162840 A1* | 7/2007 | Rochelle | G06F 17/2247 715/210 |
| 2007/0168323 A1* | 7/2007 | Dickerman | G06F 17/30489 |
| 2008/0301560 A1 | 12/2008 | Rogers et al. | |
| 2009/0059909 A1 | 3/2009 | Sullivan | |
| 2010/0114739 A1 | 5/2010 | Johnston | |
| 2011/0185305 A1* | 7/2011 | Lai et al. | 715/772 |
| 2011/0202848 A1 | 8/2011 | Ismalon | |
| 2012/0042242 A1 | 2/2012 | Garland et al. | |
| 2012/0310899 A1 | 12/2012 | Wasserman et al. | |
| 2013/0007299 A1 | 1/2013 | German et al. | |
| 2013/0042190 A1* | 2/2013 | Ciloci | 715/764 |
| 2013/0116986 A1* | 5/2013 | Zhang et al. | 703/2 |
| 2013/0304797 A1 | 11/2013 | Warren et al. | |
| 2013/0326046 A1 | 12/2013 | Chan et al. | |
| 2014/0149836 A1 | 5/2014 | Bedard et al. | |
| 2014/0149838 A1 | 5/2014 | Bedard et al. | |
| 2014/0149839 A1 | 5/2014 | Bedard et al. | |
| 2014/0200994 A1 | 7/2014 | Carignani et al. | |

OTHER PUBLICATIONS

Houska, Antonin. "New implementation of XML for PostgreSQL", Published Oct. 26, 2012, retrieved from http://wiki.postgresql.org/images/4/4a/Pg_xnode_pgconf_2012.pdf.

Kessleman, Joe et al. "Document Object Model Traversal", Published Nov. 13, 2000, retrieved from http://www.w3.org/TR/2000/REC-DOM-Level-2-Traversal-Range-20001113/traversal.html.

Olson, Jack E. "Data Archiving". Morgan Kaufman, Published 2009.

* cited by examiner

| | A | B | C | D | E |
|---|---|---|---|---|---|
| 1 | | A Header | B Header | | |
| 2 | | 1 | 6 | | |
| 3 | | 2 | 5 | | |
| 4 | | 3 | 4 | | |
| 5 | | Formula | 7 | 33 | |
| 6 | | | | | |

C5 Evaluation

Infix: B5 + C2 + C3 * C4
Postfix: B5 C2 + C3 C4 * +

Input:

| B5 |
|----|
| C2 |
| +  |
| C3 |
| C4 |
| *  |
| +  |

Output: (empty)

---------- Recursive Evaluation of B5 ----------

B5 Evaluation

Infix: B2 + B3 * B4
Postfix: B2 B3 B4 * +

Input:

| B3 |    |    |    |
|----|----|----|----|
| B4 | B4 |    |    |
| *  | *  | B2 |    |
| B2 | B2 | +  |    |
| +  | +  |    | (empty) |

Output:

| 2 | 3 |   |   |   |
|---|---|---|---|---|
|   | 2 | 6 | 1 | 7 |
|   |   |   | 6 |   |

| C2 |    |    |    |    |    |    |
|----|----|----|----|----|----|----|
| +  |    |    |    |    |    |    |
| C3 | C3 |    |    |    |    |    |
| C4 | C4 | C4 |    |    |    |    |
| *  | *  | *  | *  |    |    |    |
| +  | +  | +  | +  | +  | +  | (empty) |

| 7 | 7 | 13 | 13 | 13 | 13 | 33 |
|---|---|----|----|----|----|----|
|   | 6 |    | 5  | 5  | 20 |    |
|   |   |    |    | 4  |    |    |

SPREADSHEET CELL DEPENDENCY MANAGEMENT

TECHNICAL FIELD

The subject matter described herein relates to managing dependencies between cells in a dashboard representation of a spreadsheet file and between components in the dashboard.

BACKGROUND

Dashboards are graphical interfaces that provide insight into data (whether stored locally and/or stored at one or more data sources) through visual representations. Visual components used in dashboards can display data from a variety of sources, including local sources such as the embedded EXCEL spreadsheet or remote data sources such as databases or RSS feeds. Dashboards can be designed and executed using a variety of software applications including, for example, SAP DASHBOARDS which is an application from SAP BUSINESS OBJECT'S BUSINESS INTELLIGENCE (BI). Various web technologies have been created that are optimized for mobile devices such as tablet computers. However, certain dashboards are not compatible or fully compatible with such web technologies. For example, difficulties can arise in connection with identifying and/or updating dependencies among cells of a spreadsheet file. Further, difficulties can arise in handling change of values within cells where other cells or components depend on the changed cell.

SUMMARY

In one aspect, a spreadsheet file and a dashboard structure file characterizing a dashboard are received. These files are then analyzed to determine dependencies. Subsequently, for each determined dependency, an event listener is registered for a dependent component that corresponds to the determined dependency. These event listeners are notified of an event from an event source when a corresponding dependee is changed. Dependent components are then updated using data from a corresponding dependee in response to event notifications so that each updated dependent component can be rendered within the dashboard.

The rendering of the updated dependent components having corresponding registered event listeners can, in some implementations, occur asynchronously. The dependent components can continue a flow of execution independently of the corresponding event listeners.

Each event source can schedule the fetching of the data used to update the corresponding dependent component. Data from at least two data sources can be fetched in a single batch.

The spreadsheet file can be in a text-based, language-independent data interchange format such as JAVASCRIPT OBJECT NOTATION (JSON) format.

The analysis of the files can include constructing a document object model (DOM) using the spreadsheet file. The components can be recursively created using the DOM. An adjacency matrix can be constructed using the spreadsheet file. This matrix can be used to recursively create the components.

The spreadsheet file can be received by a client from a remote server. The analyzing, registering, updating, and rendering can be performed at the client.

It can be determined that a first cell has a formula including a reference to a second cell. In such cases, an event listener can be registered on the second cell that propagates events to listeners registered to the first cell.

Computer program products are also described that comprise non-transitory computer readable media storing instructions, which when executed by at least one data processor of one or more computing systems, causes the at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the current subject matter enables a web-based viewing solution to render documents such as dashboard documents using only HTML5, JAVASCRIPT and standard web technologies with a cell updating triggering events with an event listening and event handling infrastructure. In particular, dashboard documents can be converted to a JAVASCRIPT-friendly format which is then rendered in any modern browser and device, including IOS devices. Such dashboard documents are complementary to those dashboard documents that are exported in other formats such as FLASH (SWF). In addition, the current subject matter is advantageous in that it can be used to provide a dashboard JAVASCRIPT viewer that obviates the need for an intermediate publishing step by converting the dashboard to its JAVASCRIPT OBJECT NOTATION (JSON) representation from an XLF file directly.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
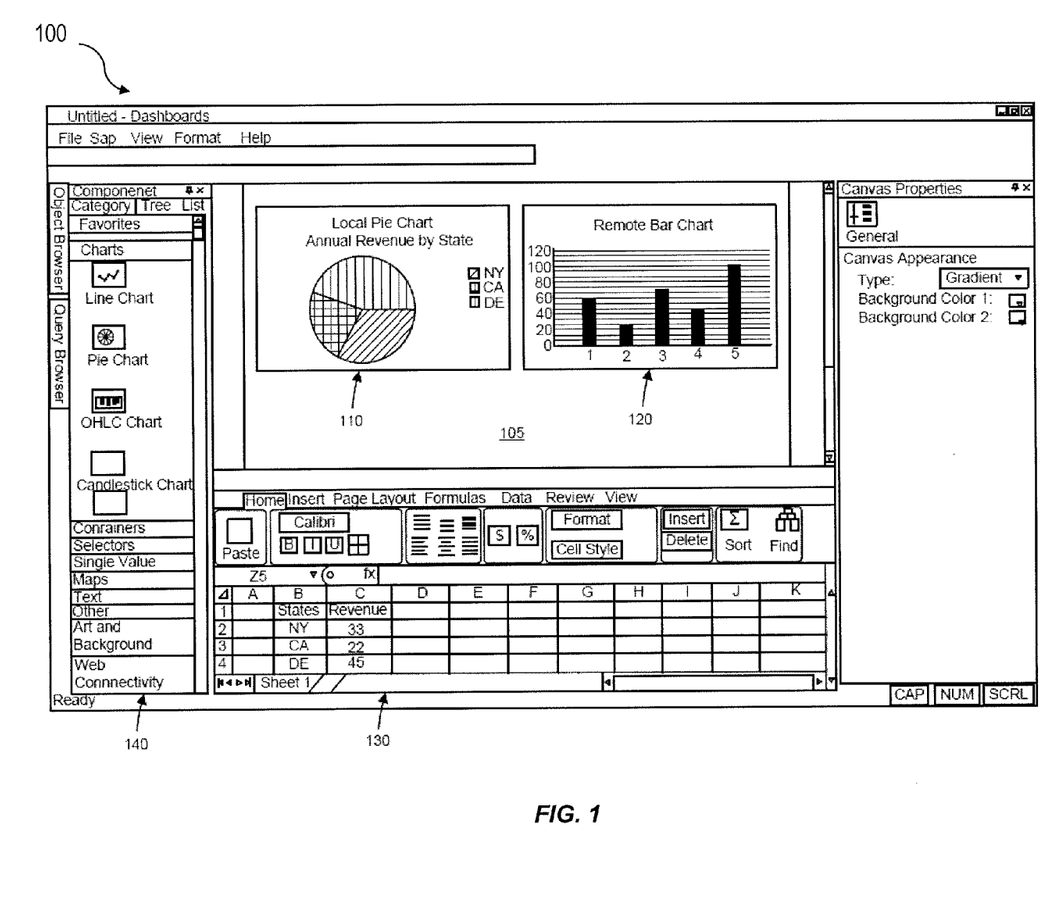
FIG. 1 is a screenshot illustrating a sample dashboard in a dashboard designer application.

FIG. 1 is a screenshot 100 that shows a sample dashboard in a dashboard designer application that includes a palette 140 of chart types and components that can be dragged and dropped onto a work surface 105. The visual component 110 titled 'Local Pie Chart' is displaying data from a local source while the visual component titled 120 'Remote Bar Chart' is displaying data from a remote data source. In addition, the dashboard can include a spreadsheet section 130. The spreadsheet section 130 can include relevant data and/or define calculations that forms which relevant data that forms part of the visualization. This dashboard can be published into one or more formats. For example it is rendered in a web browser.

Figure 2:
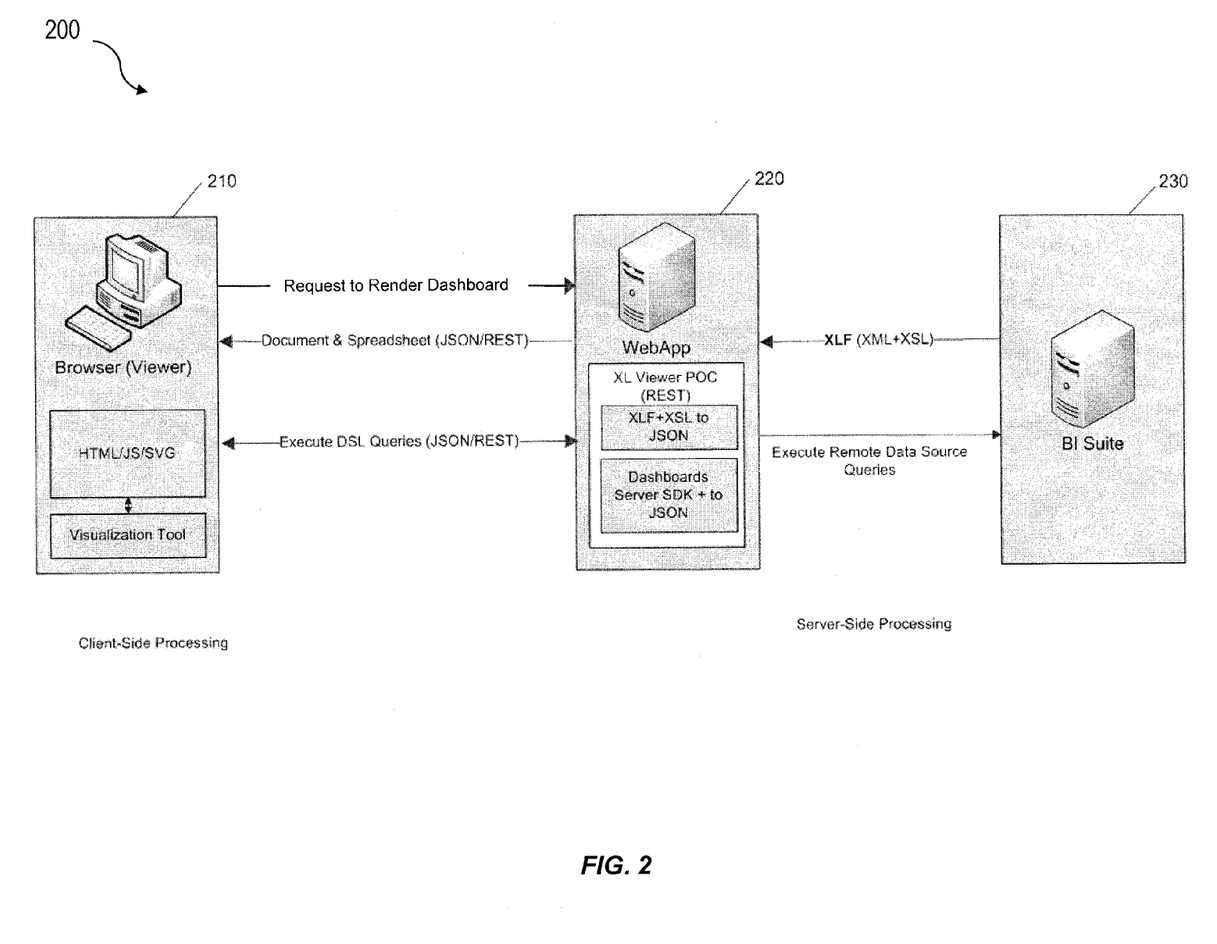
FIG. 2 is a diagram illustrating a client/server architecture.

The diagram 200 of FIG. 2 illustrates a three-tier architecture with a client 210 and a server 220 coupled to a back-end business intelligence (BI) suite 230 that communicate over HTTP. With this arrangement, the client 210 can be a web browser, while the server 220 can be a JAVA web application bundle deployed on a web server such as APACHE TOMCAT or JETTY. The server 220 can: (i) parse and convert a dashboard container file to JAVASCRIPT OBJECT NOTATION (JSON), if not in this format already, (ii) determine prompts required to be answered for a data source, and/or (iii) retrieve data from remote data sources at the behest of the client 210.

The client 210 can (i) display the visual components in the document, after populating them with data, (ii) request data from remote data sources from the server 220 and/or obtain local data, (iii) evaluate formulae, if any, in the local data and populating a visual component with the final result, and/or (iv) display prompts in the dashboard, if any, to filter on available data from a remote data source. It will be appreciated that some or all of the functionality of the server 220 can be executed on the client 210 and/or as part of an integrated BI suite 230. For example, various conversions or transformations can be performed locally at a client 210 or within the BI suite 230. By performing the conversions or transformations there this can reduce the need for an add-on application, middleware, etc.

The current subject matter is applicable to various types of dashboard features and components. For example, the current subject matter is applicable to data retrieved from a semantic layer overlying a data source, for example, SAP's DIMENSIONAL SEMANTIC LAYER (DSL) and spreadsheet data consumption, on-the-fly EXCEL formula evaluation and various widgets such as visualizations: charts (e.g., pie, line, bar), tables, maps; content holders: tabs, sheets; interactivity elements: controls (e.g., sliders, dials, prompts); and support for DSL prompting. Prompting is where a user is asked for input that parameterizes a query or how a result set is formatted.

A dashboard container file is used that can contain one or more metadata files and one or more spreadsheet files. Examples include files using the extension .XLF which is the extension used for SAP DASHBOARDS. With this particular example, the container file is an XLF file comprising an XLS spreadsheet and an XML document, compressed into a single file. For example, together in ZIP file format. XML in this regard refers to Extensible Markup Language (XML), a standardized data format notation, as defined by the WORLD WIDE WEB CONSORTIUM (W3C). In some variations, the XML format stores metadata about the dashboard in a dashboard structure file. This metadata includes information such as: dashboard components, component properties, component association with cells in an associated spreadsheet, data sources, dashboard layouts, dashboard behavior, etc. Components can be organized into categories like functionality: input components, output components, layout components. It will be appreciated that the current subject matter can apply, in addition to XLF files, to a wide variety of container files including bundles having multiple spreadsheet files (and are collectively referred to as container files unless otherwise specified).

JAVASCRIPT OBJECT NOTATION (JSON) is a lightweight, text-based, language-independent data interchange format. It was derived from JAVASCRIPT a programming language that implements the ECMAScript Programming Language Standard. JSON defines a small set of formatting rules for the portable representation of structured data. While the disclosure is mainly directed to the use of JSON, it will be appreciated that the current subject matter can use other data interchange formats having similar properties.

JSON is widely used for JAVASCRIPT-based web applications because it is a native JAVASCRIPT data format. One obvious benefit of this is that web applications can avoid the overhead of converting to and from other data formats. This leads to leaner processing times and a smaller memory footprint for the application. To exploit the benefits of JSON listed above, the metadata in the XML document can be converted into another format such as JSON. This is a one-time conversion that occurs when the dashboard is opened for viewing. After the metadata is converted into JSON, the web application uses the JSON representation of the document's metadata for all subsequent work.

With further reference to the diagram 200 of FIG. 2, the client 210 sends a request to the web server 220 via a DSL query to render a dashboard. This request can be in various formats and handled via various protocols including JSON/Representational State Transfer (REST), and XML/Simple Object Access Protocol (SOAP). The web server 220, in response to the request, executes one or more remote data source queries of the BI suite 230. The BI Suite 230 then delivers a container file (e.g., an XLF format file) responsive the remote data source queries to the web server 220. The web server 220 can, as will be further described below, convert/parse the XLF file to JSON. This can be offered as a web service. In addition, a software development kit (SDK) can be implemented on a dashboards server (which may be integral to the web server 220 or coupled thereto) to further the conversion to JSON. The web server 220 can transmit data to the client 210 comprising the JSON representation of the dashboard via REST protocol. The client 210 can then render the dashboard using, for example, a browser executing HTML/JAVASCRIPT, SVG, a JAVASCRIPT library to display given digital data into dynamic graphics, and/or using visualization tools, such as, GOOGLE Visualization, and Data-Driven Documents (D3).

Figure 3:
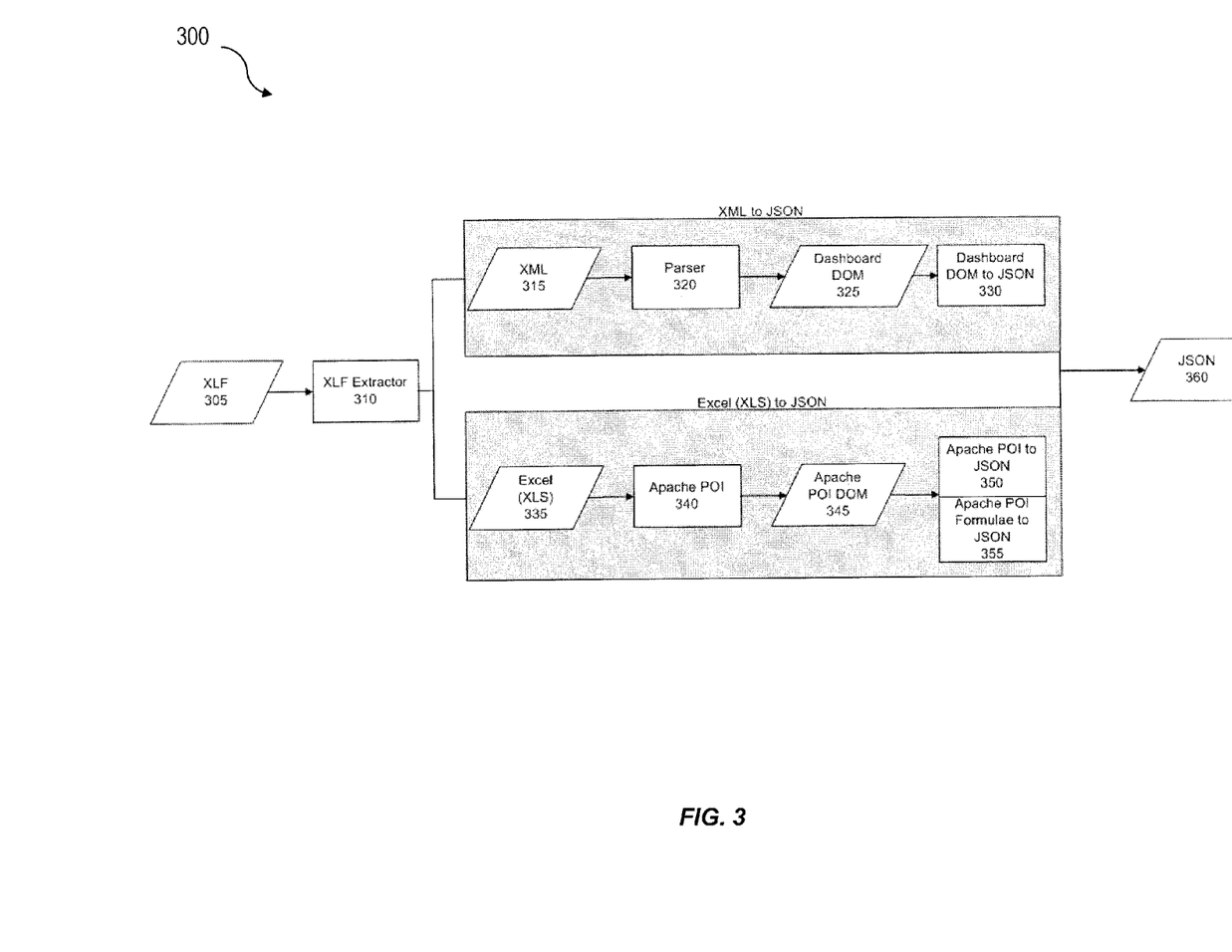
FIG. 3 is a process flow diagram illustrating conversion of an XLF format file into JSON.

FIG. 3 is a diagram 300 illustrating various stages involved in converting a container file 305 comprising an XML document 315 and an XLS document 335 to a JSON file 360.

A method to convert the XML document in the XLF file to a temporary DOM and from there into JSON is described in pseudo-code below:

1. Open, using an XLF extractor 310, the XLF document using a ZipInputStream;
2. Create a XMLStreamReader (JAVA SDK StAX implementation) from the XML portion of the XLF (to result in the XML document 315);
3. An XMLStreamReader parser 320 is advanced until it encounters one of a plurality of specified events, such as:
    a. Component
        i. Component properties are parsed into key-value pairs ii. Sub-components are recursively parsed
iii. Dependencies on data sources are parsed
b. Data Source
i. Data source properties are parsed into key-value pairs
ii. Dependencies between data sources and cells are parsed
c. Other style-related attributes.
4. The result of the parsing is a simple dashboards DOM (320) storing the information collected;
5. The dashboards DOM is then traversed (325) in a depth-first traversal through the components and data sources. The JSON.org JAVA classes are used, at 330, to output the resulting JSON format (360).

The spreadsheet file 335 (e.g., XLS document) is the second file inside the container file 305 (e.g., zipped dashboards document (XLF)). The spreadsheet file 335 can be, for example, a MICROSOFT EXCEL spreadsheet. The spreadsheet file 335 comprises components such as sheets, rows and cells. This spreadsheet file 335 can be used in the dashboards document in a few different ways:
1. Cells in the spreadsheet can contain formulae and data;
2. Cells in the spreadsheet can be used as depositories for data retrieved from at least one remote data source;
3. Cells in the spreadsheet can be used as data sources for visual components in the dashboard; or
4. Cells in the spreadsheet for storing input from users including prompt values.

The web application can receive the metadata about the document in JSON format (as part of the above-described XML to JSON conversion process). To maintain consistency with this approach, the data in the spreadsheet file 335 (e.g. XLS document) can also be converted into JSON and passed into the web application.

Converting a spreadsheet file 335 into the JSON format required by the web application can be done using an APACHE POI library 340, a JAVA-based EXCEL parsing and converting library. Once the spreadsheet file 335 is loaded by the APACHE POI Library 340, it can parse the contents and convert it into a first intermediate state, an APACHE POI Object 345. The parser can use a straightforward mechanism to pass over the spreadsheet, rows and cells that make up the document to generate the object 345. The first intermediate state, the APACHE POI Object 345 can be converted into JSON by one of two processes: the operation of a Converter for Data in APACHE POI Object to JSON 350, and a Converter for Formulae in APACHE POI Object to JSON 355. The data can be converted without use of further intermediate states into JSON format. The formulae can be handled by the Converter for Formulae in APACHE POI Object to JSON 355 that iterates over the spreadsheet, rows and cells that make up the document and makes use of a further intermediate state. On encountering formulae, the Converter for Formulae in APACHE POI Object to JSON 355 can extract the formulae. The APACHE POI library's native formula representation is a postfix notation, which is advantageous for programmatic stack-based evaluation. The postfix representation of the formulae is a second intermediate state for converting to JSON. The Converter for Formulae in APACHE POI Object to JSON 355 can produce the postfix representation and then convert it to JSON 360. This postfix notation becomes the JSON representation of that formula, for that particular cell.

Various types of XML parsers can be used, including, for example, document object model (DOM) parsers, pull parsers, and push parsers. DOM-based parsing reads the entire XML document into memory and builds a tree-based data structure, from which data can then be retrieved on demand. This increases the memory footprint of the application and can result in longer latencies, since the entire document has to be read and loaded into main memory all at once. Pull parsing gives the calling application more control over the document that's being parsed, by letting the calling application control the parser. Push parsing is the converse of pull parsing where the parser controls parsing events and the calling application has to respond to events from the parser.

In some implementations, a pull parser can be utilized because it provides a smaller memory footprint and lower response times, as well as letting the calling application retain control of the parsing process. For example, a StAX parser such as that included in ORACLE'S JAVA 1.6 Software Development Kit (SDK) can be used. Using the parser, a lightweight DOM, representing the dashboard, can be built in memory, based on the metadata from the dashboard file.

The metadata converted from XML into JSON can include:
1. Components, e.g., graphs, bar charts;
2. Data sources, e.g., a list of cells in the spreadsheet or a connection to a database;
3. Properties, e.g., attributes of charts such as line colours or font sizes; and
4. Data bindings, e.g., how data connections are bound to visual components such as charts.

The DOM, representing the dashboard, built in main memory is much smaller than the XML DOM that would have been built with a DOM-based XML parser because it excluded properties that were not required. Once the custom DOM, representing the dashboard, is completely built in memory, it is transformed to JSON and returned to the web browser. For example, this is done when the web browser makes a request for it (which request can include an ID corresponding to the DOM). The actual transformation of the DOM into a JSON string can be achieved by a depth-first recursive traversal of the tree.

Figure 4:
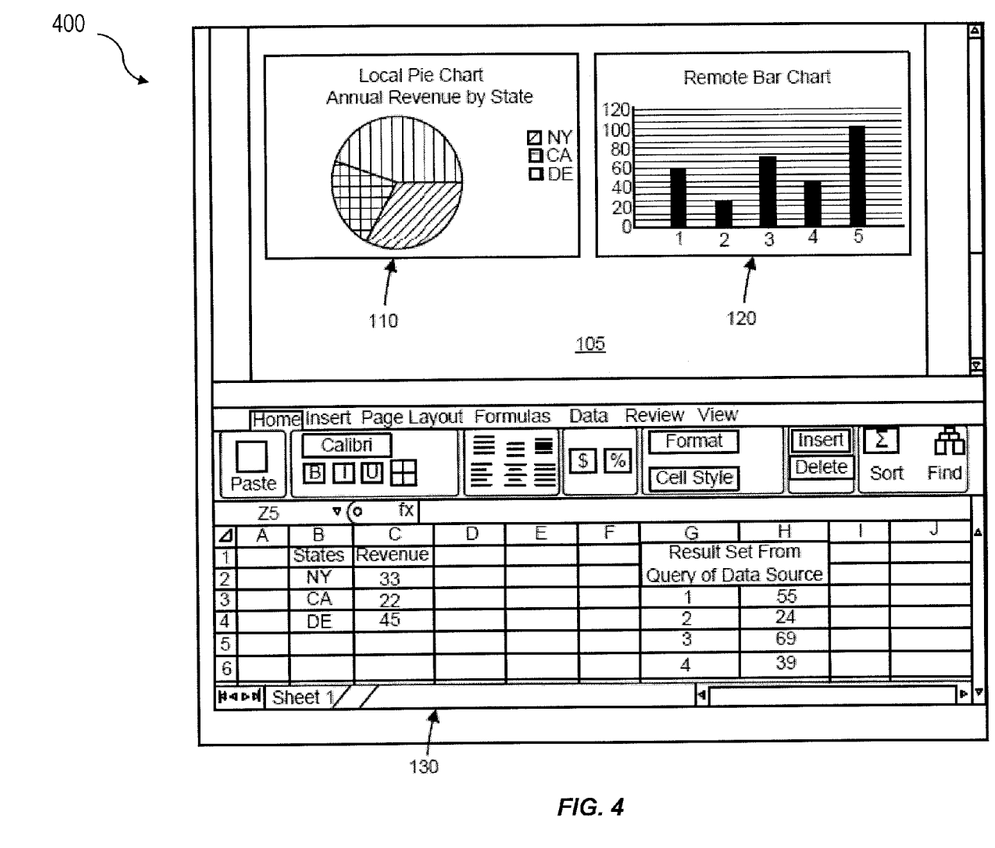
FIG. 4 is a screenshot illustrating the dashboard of FIG. 1 with data originating from local and remote data sources.

Once the web application requests and receives the JSON payload representing the dashboards document, it is up to the client-side JAVASCRIPT (which may be part, for example, of a browser, etc.) on the client 210 to display the visual components. FIG. 4 is a screenshot 400 that shows the two types of data sources that can be used to populate a visual component in a chart. Cells B1 through C4 show data stored in the spreadsheet. While cells G2 through H6 show the results of query (not shown) to a remote data source. When a dashboard document is received by the client 210 in JSON format, the information about the data sources can be preserved and available in the JSON object. On loading the JSON object from the server, the client 210 identifies the visual components present in the dashboard document. Each component is then rendered, but only after the data that populates the component is available from a data source, remote or local.

With further reference to FIG. 4, Remote Bar Chart 120 renders the results of the remote data source that it depends on, while Local Pie Chart 110 shows the data obtained from the local data source, i.e., the spreadsheet document that was present in the container file (e.g., an XLF file, etc.). When the remote data source has finished retrieving its data, it notifies the components listening to it, such as, a visual component that the data is available and the visual component renders itself, using the supplied data. This form of notification is an example of events and event listening, where an entity can register as a listener for any type of event on a different entity.

When the client 210 receives the JSON representation of the dashboards document from the web server 220, the document can be analyzed to determine the components, data sources and their dependencies between each other in the dashboard. When a component depends on a data source it can register a listener to be notified whenever the data source fetches new data. A data source (X) can also register a listener on another data source (Y) if X depends on the result of Y.

If a component depends on a data source in order to render then the act of rendering that component can occur in multiple asynchronous steps. First, the component can notify the data source that data is required. The component can then continue the flow of execution (without blocking/waiting for the data source) knowing that once the data source has fetched data the component's listener will be notified of the new data. The data source can then schedule a fetch of the data (the exact mechanics of this depends on the data source). When the data source finishes fetching the data, all listeners, including any components who notified the data source, can be notified. At this point the original component, and any other that notified the data source, can perform the rendering.

By asynchronously triggering the data fetch, fetching the data and notifying data source listeners the data sources need not perform the act of fetching data until required. This asynchronous technique can also allow data source fetching to be done in batches by potentially combining multiple fetches of the data into one. For example, if multiple components attempt to render within a short window of time, the data source may only fetch the data once and then notify all dependent components of the data change.

A method for setting up an event infrastructure can be as follows:
1. The client 210 receives the JSON representation of the dashboard document from the web server 220;
2. The JSON representation is used to construct a model representing the components and data sources;
3. Components are recursively created because a component can contain multiple sub-components;
4. Dependencies between components and data sources are discovered and appropriate event listeners are registered.

Spreadsheets can also contain inter-cell dependencies, when a formula depends on the value of another cell. An example of this can be seen in the diagram 500 of FIG. 5. In B5, Formula A depends on cells B2, B3 and B4. When the value in B3 is changed to '2' from '5', then Formula A is notified of this change and cell B5 is updated. This type of notification and update management is native to some spreadsheet applications such as MICROSOFT EXCEL, but needs to be carefully simulated in JAVASCRIPT, so that the web application may take advantage of this type of event propagation.

Figure 5:
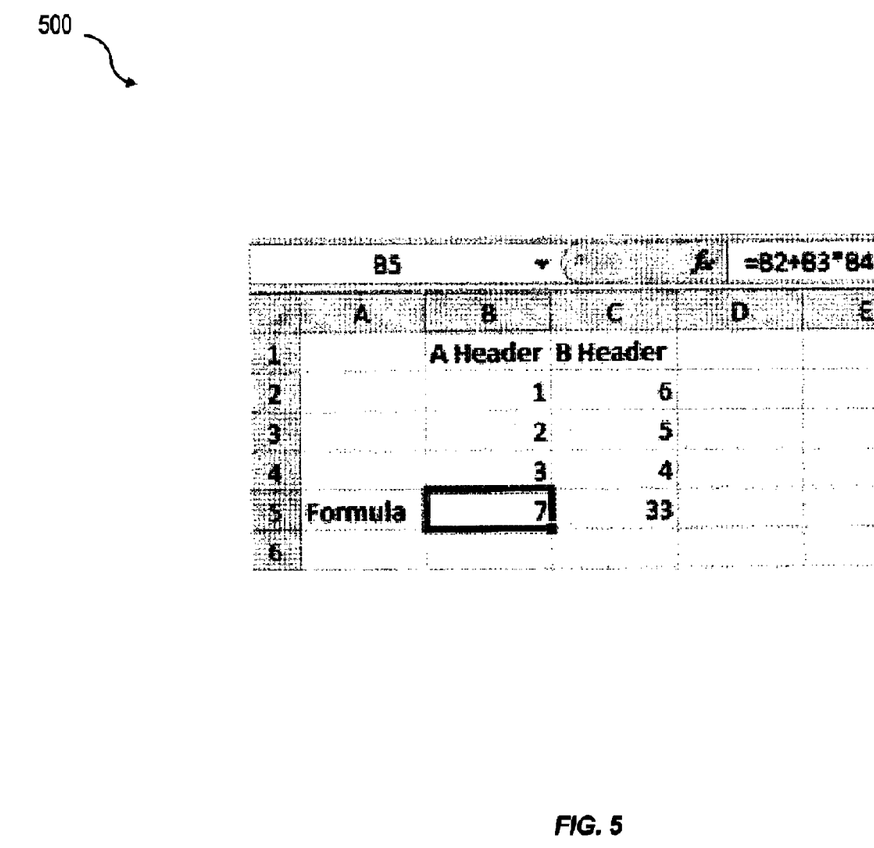
FIG. 5 is a screenshot of a spreadsheet illustrating cell dependency management.

Notification and update management can be achieved by iterating over the JSON representation of the spreadsheet file, and finding all dependencies between all formulae. As seen in FIG. 5, if Formula A depends on cells B2, B3 and B4, Formula A registers a listener on B2, B3 and B4. If either B2, B3 or B4 are updated, then the event listener registered by Formula A is notified. Formula A treats this notification as a change to itself and can further notify all listeners that have registered with Formula A. In this way, a change in a cell can be propagated through a chain of listeners without actually evaluating the formula itself. This approach can be advantageous in that formulae are lazily executed, which leads to a reduction in the memory footprint of the application.

A method to set up cell dependencies can be as follows:
1. The client 210 receives the spreadsheet file as JSON from the web server 220
2. For each sheet, row and cell,
   a. If the cell contains formula F1
      i. If formula F1 contains a reference to another cell, C1
         1. An event listener is registered on C1 which propagates the event to the listeners of F1

One type of data source is the spreadsheet file which was converted to JSON at the web server 220 and sent to the client 210. Spreadsheet cells can contain not only raw data, but also formulae, which might contain references to other cells or mathematical functions. If a visual component relies on cells that contain formulae, these formulae have to be evaluated in order to display that component. As the formula is a JSON object, like the rest of the document, there is very little overhead in evaluating the formula in JAVASCRIPT. Postfix notation lends itself to straightforward evaluation on a stack-based evaluator, as seen below.

Figure 6:
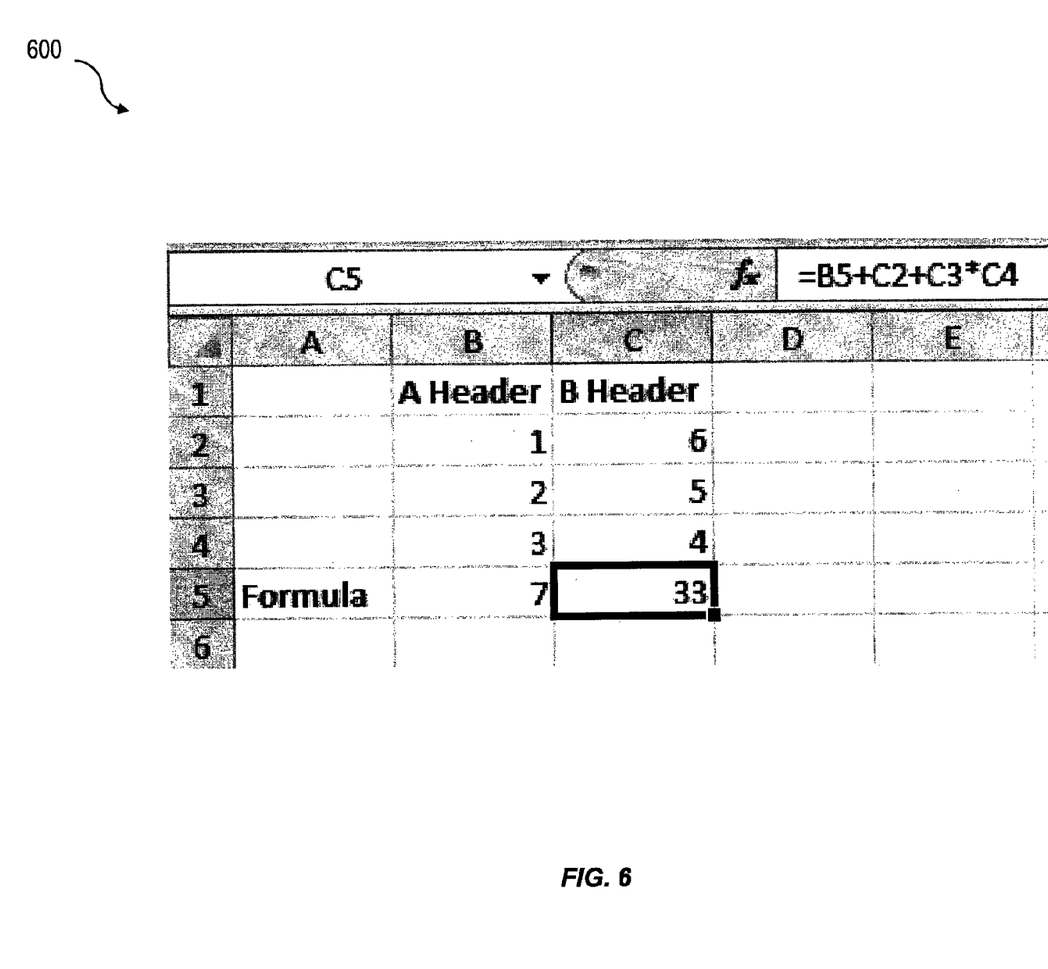
FIG. 6 is a screenshot of a spreadsheet illustrating a first cell with a formula referencing a second cell to another cell using a formula.
Figure 7:
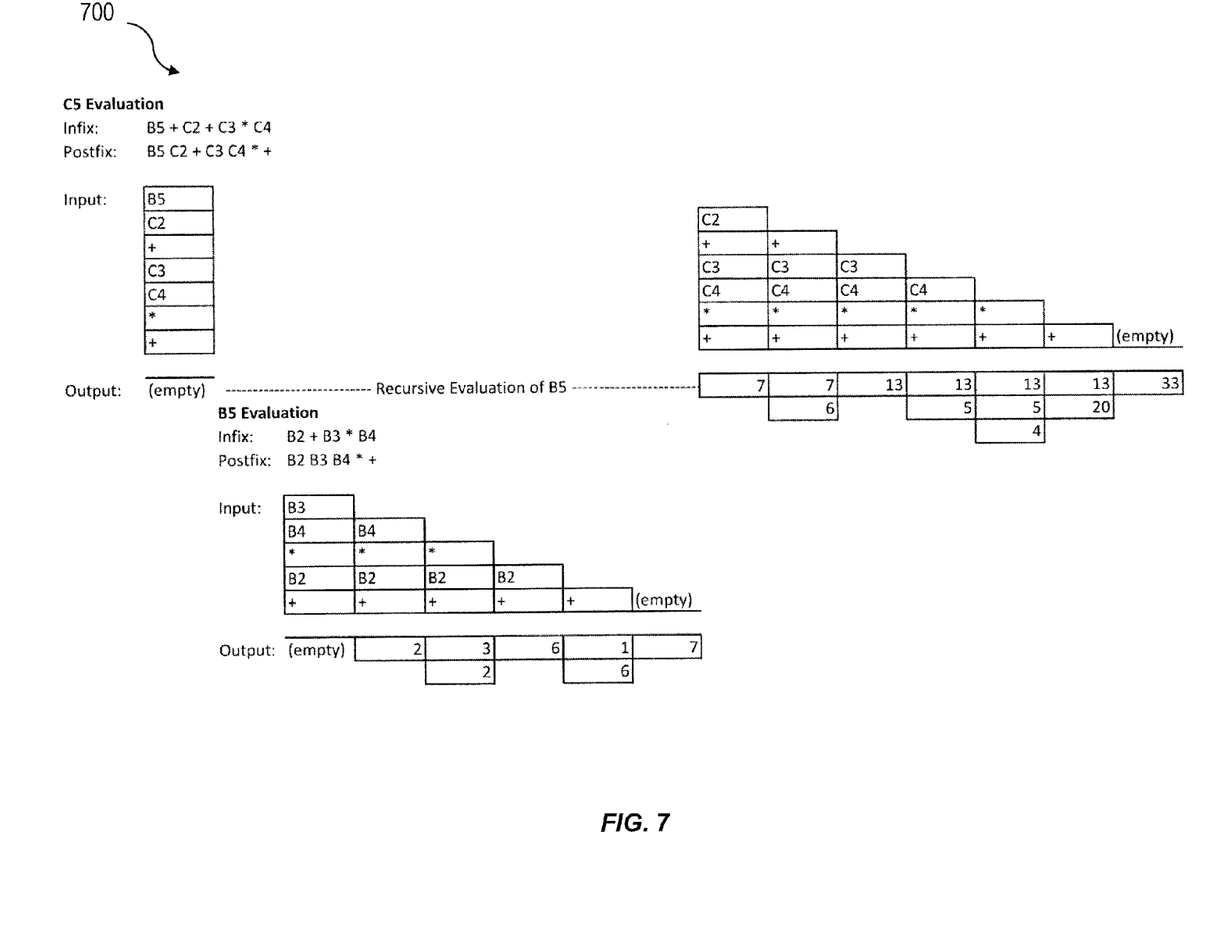
FIG. 7 is a diagram illustrating recursive evaluation of the formula in the first cell of FIG. 6.

With reference to the diagram 600 of FIG. 6, a formula (C5) contains a reference to B5 (also a formula). When a cell contains a reference to another cell in its formula, the formula can be evaluated using recursion. One example recursion technique is illustrated in the diagram 700 of FIG. 7; when formula C5 is evaluated, B5 is recursively evaluated. In this manner, a formula that was originally contained in an EXCEL spreadsheet can be received and evaluated using JAVASCRIPT in a client-side application.

A method for evaluating a spreadsheet formula in its JSON representation can be as follows:
1. Create a result stack
2. For each token of the formula in postfix notation
   a. If the token is a value (that is, literal or constant), push it onto the result stack
   b. If the token is a function
      i. Pop the necessary function arguments off the result stack
      ii. Evaluate the function
      iii. Push the result of the function onto the result stack
   c. If the token is a cell reference
      i. Fetch the value of the referenced cell(s), potentially in a recursive fashion if that cell is also a formula Dashboards can include functionality including prompts and answering prompts to provide input, customizations, drill downs, etc. to the dashboard. Such prompts are normally answered by asking the user to input a value. An example of a prompt in a dashboard would be filtering values by a certain time period, such as, a year or a quarter. If a dashboard is designed to display sales for a certain quarter based on the answer to a prompt, then when the user selects '1' as the quarter, the dashboard displays sales for the first quarter.

On top of interactive prompting in dashboards, prompts can be answered using values from certain cells. In the example above, if the dashboard was set up to use the value in a cell, e.g. C3, as the answer to the 'Quarter' prompt, then it would show all sales values for the first quarter, just as if it had been specified in an interactive text field.

Cell values can also be designated as the output depositories of interactive components such as sliders. For example, in the diagram 800 of FIG. 8, the value for a slider graphical user interface element 810 for a pie chart 820 can be changed from 1 to 4, and when the slider is moved, cell C3 is updated with the slider's current value. If cell C3 is designated as both the input source for a prompt and the output depository for an interactive component, then the answer to a prompt can be supplied from the cell value and updated as the value in the cell is updated.

Figure 8:
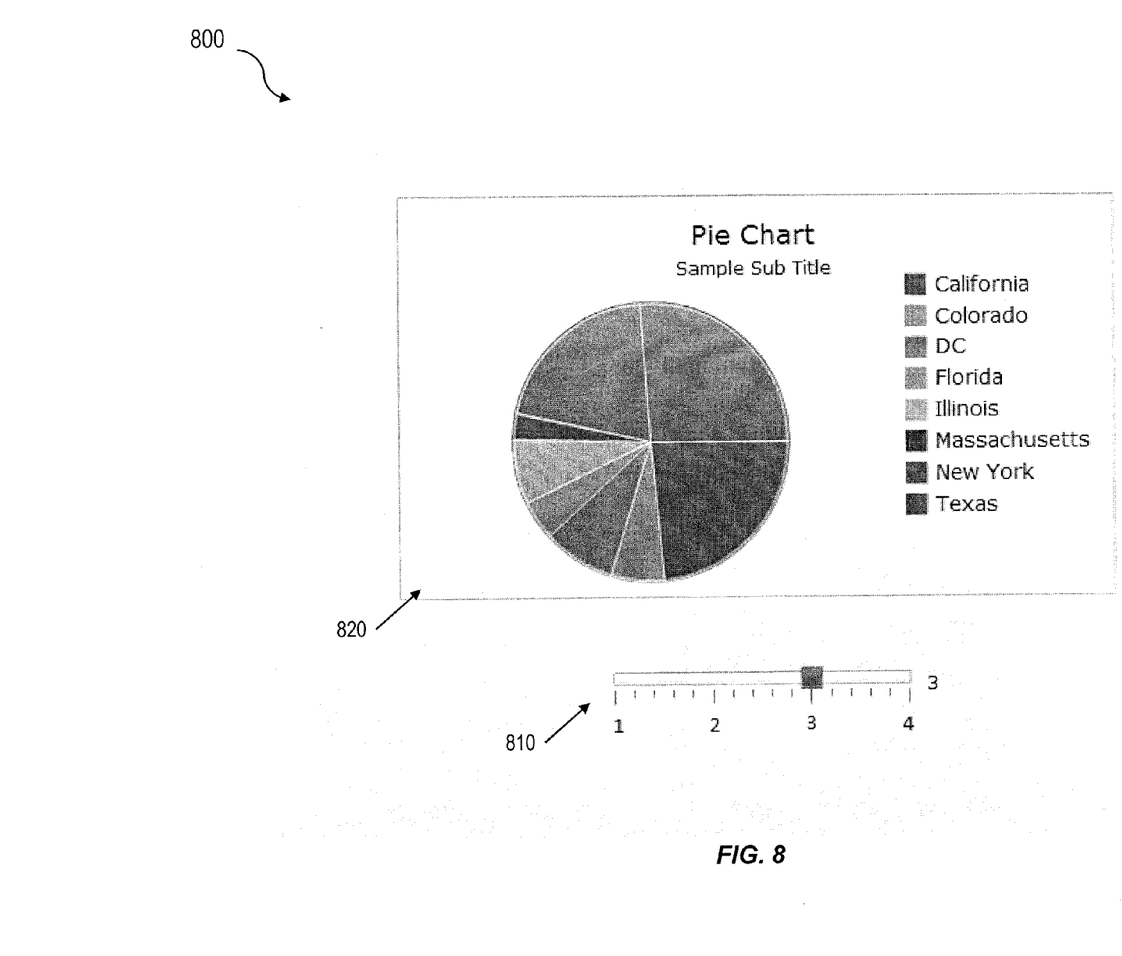
FIG. 8 is a diagram illustrating an interface with a graphical user interface prompt element.

The process of propagating the events that are fired when the cell is updated due to a change in the visual component, all the way to the redrawing of the dashboard, is described below. In the example of FIG. 8, the slider 810 writes its updated value to cell C3. The updated cell then broadcasts to its listeners that it has been updated. A subsequent query directly or indirectly consumes the content of a cell and launches a query using the output as is or modified as a prompt. The query results are populated in the designated result area. The listeners to this area are alerted on update. The listeners can include a chart.

Prompting can be implemented in JAVASCRIPT as follows:
1. On document setup
    a. For any prompts answered by a cell, register a listener on that cell which reruns the prompt's query;
2. On query execution, fetch the prompts that need a value in order to run this query (this may be a remote call to a server). When the prompts are known, an asynchronous callback executes Step 3.
3. Once the prompts are known, each must be answered
    a. If a prompt is bound to a cell, fetch the cell value and proceed to Step
4. Note that this cell value is fluid and is subject to change by, for example, the output of other components such as sliders.
    b. Otherwise display a visual user input component. When the user submits input, an asynchronous callback executes Step 4
4. If not all prompts have been answered, repeat Step 3.
5. Execute the query (this may be a remote call to a server) using all the prompt answers from Steps 3-4.

Additionally, dashboards can consist of a mixture of local and remote data sources. Documents that contain remote data sources usually refer to other objects deployed with the BI suite 230, and thus require a working installation of the BI suite 230 in order to retrieve data. However, visual components that rely on local data sources, such as the cells in the spreadsheet document do not need a working BI suite 230 install in order to display correctly.

With the current subject matter, a JAVASCRIPT dashboards viewer can be provided that allows a user to upload (via client 210) a dashboard to the server-side service (via server 220) and view the visual components that rely on local data sources, in the absence of a BI suite 230 install. This arrangement can be achieved by identifying the local data sources and the components that depend on them during conversion of a dashboard container file (e.g., XLF file) to JSON, without maintaining a copy of the file on the server. When the browser on the client 210 receives the JSON representation of the document and renders the visual components, the data from the local data sources exists in the JSON representation and can be retrieved immediately, without any remote calls to the server 220. If the document has remote data sources, then data retrieval from those data sources can fail in the absence of a BI suite 230 install.

Thus, a dashboard which would previously be viewed after publication and usually in a 'managed' environment can now be viewable in an 'unmanaged' state, due to:
1. Independence from the BI suite 230, which was used to host the published artifact, in the shown example, the SWF file (representation of the dashboard);
2. Independence from the need to publish any sort of intermediate artifact at all, allowing users to view the dashboard from the raw XLF file itself.

The following are a sequence of steps that can be performed each time a managed document with mixed local and remote sources is viewed using the server-side service:
1. The client 210 uploads an XLF file to the server 220 using HTTP;
2. The server 220 parses the file and returns JSON to the client 210;
3. The client 210 displays the visual components that depend on local data sources; and
4. Visual components that depend on managed remote data sources are not displayed, due to the lack of a managed environment.

Figure 9:
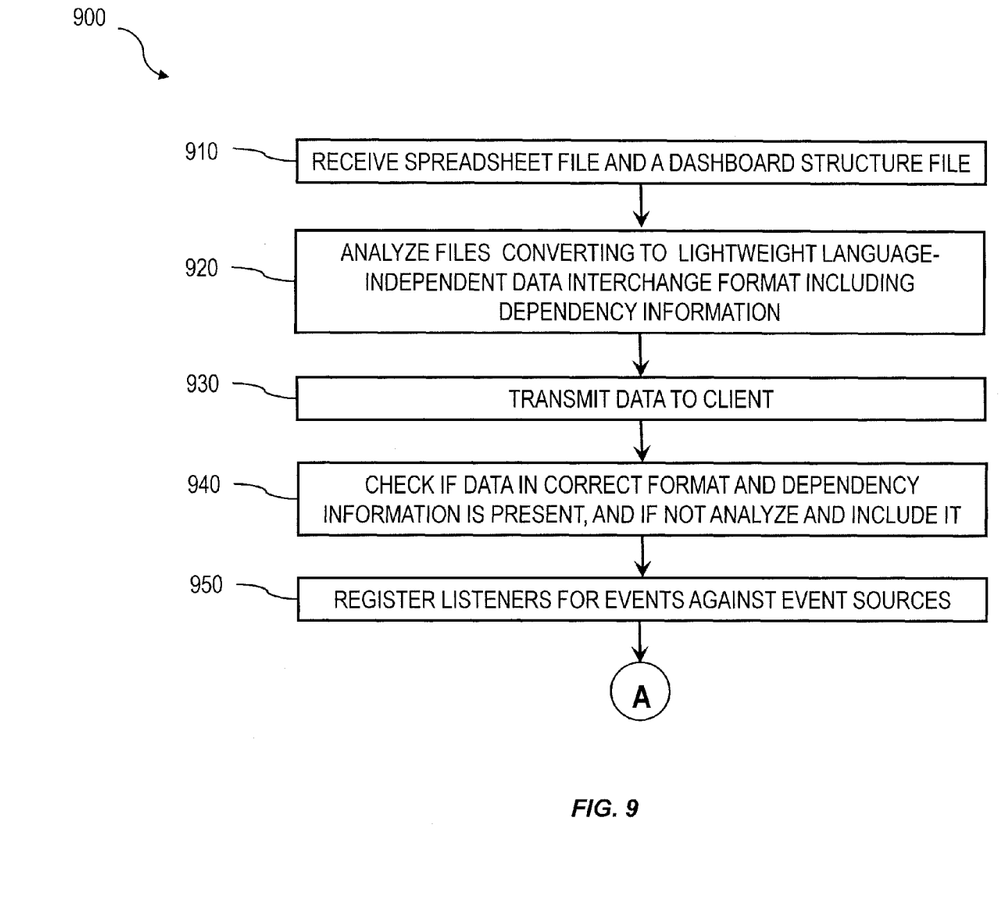
FIG. 9 is a process flow diagram for managing cell dependencies within a spreadsheet by creating an eventing framework.

FIG. 9 is a process flow diagram 900 for identifying dependencies in which, at 910, a spreadsheet file and dashboard structure file are received. For example, the spreadsheet file and dashboard structure file can be received at the server. Thereafter, at 920, the files are analyzed and the contents are converted to data in a text-based, lightweight, language-independent data interchange format. The analysis determines the dependencies between components in the dashboard, cells in the spreadsheet, and data sources (such as those dependents and dependees described above and illustrated in FIG. 5). A component, such as, an output component, say a chart, could be dependent on a set of cells or another component—the dependee. The dependency of two components can be through one or more cells, one or more data sources, one or more components, and the like. The data format includes information about the structure of the dashboard. The data is sent to the client, at 930. The client, at 940, checks to see if the data is in the text-based, language-independent data interchange format, for example, JSON. The check is also made to see if the dependency information is present. If either of these checks fails the data is analyzed and the contents converted to data in a text-based, language-independent data interchange format including dependency information. Based on such determination, at 950, listeners are registered for components that correspond to the determined dependencies. A framework of event listeners and event sources can be created.

In some implementations, each event listener can be paired with an event source and each of these pairings can reflect a dependency between components, cells, and data sources. Such an eventing framework is simple to create but may have redundant listeners. As a result, in some variations, the eventing framework can be optimized to remove the redundant event sources and event listeners. For example, the framework can be modeled as a graph or a tree. In the case of a tree, the root node of the tree is the ultimate listener, that is, final destination of the event, and the leaf nodes are event sources. An optimization can include registering the ultimate listener directly on the event sources, or leaf nodes, replacing the intervening parent-child pairs of event sources and event listeners. For example, the event listener framework can be stored as an adjacency matrix. An adjacency matrix is a matrix in which the labels of rows and columns are the nodes of a graph. The matrix entries of 1 mean the corresponding nodes are adjacent in the graph. The entry zero means there is no edge between the nodes. Taking this matrix as input and specifying one or more event sources in the matrix, a set of dependent nodes can be created by recursively following the connections. With such an implementation, redundant nodes are not added based on the entries in the adjacency matrix.

Figure 10:
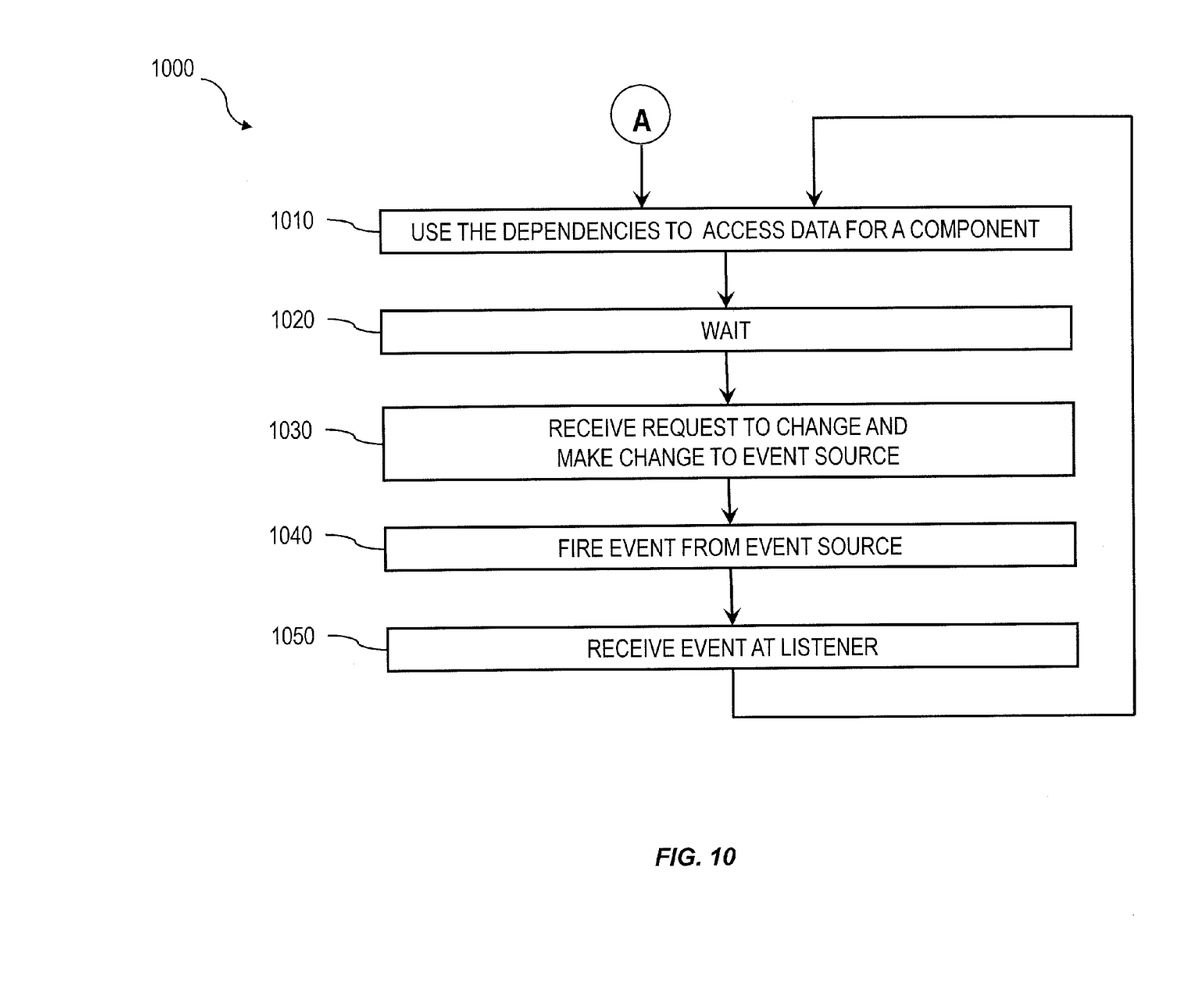
FIG. 10 is a process flow diagram for using an eventing framework to manage dependencies.

FIG. 10 is a process flow diagram 1000 for using an eventing framework to manage dependencies (which can, for example, continue via element A from the diagram 900 of FIG. 9). At 1010, the client uses the dependencies to access data for a component. For example, two cells that are arguments to a binary function whose output is displayed in a dashboard can be accessed. The dependencies are used and not the eventing framework. In order words, the flow of execution of the components is followed. The use of dependencies can be to support, for example, rendering a component in a dashboard that depends on a value in a spreadsheet. Another example dependee is a data source. Thereafter, at 1020, the client waits. A rendered dashboard can be displayed on the client to a user. At 1030, the client receives a request to make a change to a component or cell. For example, receive a user's input. This component or cell is associated with an event source and a change is made to the component or the cell. With the change, at 1040, an event is fired from the event source. This event, at 1050, is received by one or more event listeners. Processing continues with, at 1010, the client using the dependencies to access data, take inputs to functions, and the like.

Various implementations/aspects of the subject matter described herein may be realized in digital electronic circuitry, integrated circuitry, specially designed application specific integrated circuits (ASICs) computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a cathode ray tube (CRT) or liquid crystal display (LCD) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, it will be appreciated that the current subject matter is applicable to different formats other than those specified herein. Furthermore, it will be appreciated that the various conversion techniques of spreadsheet files and XML files can be used independently from the particular applications described herein. Other embodiments may be within the scope of the following claims.

What is claimed is:

1. A computer-implemented method comprising:

receiving a spreadsheet file and a separate dashboard structure file comprising metadata characterizing a dashboard;

rendering, using the spreadsheet file and the dashboard structure file, the dashboard, wherein the rendered dashboard includes a plurality of visual components, and wherein one or more of the plurality of visual components are adapted to provide visual representations of at least a portion of data from the spreadsheet file;

analyzing the spreadsheet file and the dashboard structure file to determine at least one dependency between one or more cells in the spreadsheet file and a first visual component comprising the rendered dashboard;

registering, for the at least one dependency, an event listener, wherein the event listener is paired with an event source comprising the one or more cells in the spreadsheet file, wherein the first visual component comprises a dependent component and the one or more cells comprise a dependee of the at least one dependency, and wherein the event listener is notified of an event from the event source when the dependee is changed;

notifying the event source that data is required for updating the dependent component in response to an event notification received at the event listener, wherein the first visual component is configured to continue a flow of execution independently of the event listener such that a second visual component is rendered while the event source schedules fetching of the data used to update the dependent component; and rendering, within the dashboard, the first visual component comprising the dependent component upon the event listener receiving notification that the event source has finished fetching the data required to update the dependent component.

2. A method as in claim 1, wherein the rendering of the updated dependent components having corresponding registered event listeners occurs asynchronously.

3. A method as in claim 1, wherein the spreadsheet file is in a text-based, language-independent data interchange format.

4. A method as in claim 3, wherein the text-based, language-independent data interchange format comprises an object notation format derived from a programming language that implements the ECMAScript Programming Language Standard.

5. A method as in claim 1, wherein the analyzing comprises: constructing a document object model (DOM) using the spreadsheet file.

6. A method as in claim 5, wherein the analyzing further comprises: recursively creating the components using the DOM.

7. A method as in claim 1, wherein the spreadsheet file is received by a client from a remote server.

8. A method as in claim 7, wherein the analyzing, registering, updating, and rendering are performed at the client.

9. A method as in claim 1, wherein data from at least two data sources is fetched in a single batch.

10. A method as in claim 1, further comprising:
determining that a first cell has a formula including a reference to a second cell; and
registering an event listener on the second cell that propagates events to listeners registered to the first cell.

11. A method as in claim 1, further comprising:
constructing an adjacency matrix using the spreadsheet file, the adjacency matrix having
labels of rows and columns correspond to nodes of a graph in which entries of 1 indicate that corresponding nodes are adjacent in the graph and entries of zero mean there is no edge between the nodes.

12. A method as in claim 11, wherein the analyzing further comprises: recursively creating the components using the adjacency matrix.

13. A non-transitory computer program product storing instructions, which when executed by at least one data processor of at least one computer system, result in operations comprising:
receiving a spreadsheet file and a separate dashboard structure file comprising metadata characterizing a dashboard;
rendering, using the spreadsheet file and the dashboard structure file, the dashboard, wherein the rendered dashboard includes a plurality of visual components, and wherein one or more of the plurality of visual components are adapted to provide visual representations of at least a portion of data from the spreadsheet file;
analyzing the spreadsheet file and the dashboard structure file to determine at least one dependency between one or more cells in the spreadsheet file and a first visual component comprising the rendered dashboard;
registering, for the at least one dependency, an event listener, wherein the event listener is paired with an event source comprising the one or more cells in the spreadsheet file, wherein the first visual component comprises a dependent component and the one or more cells comprise a dependee of the at least one dependency, and wherein the event listener is notified of an event from the event source when the dependee is changed;
notifying the event source that data is required for updating the dependent component in response to an event notification received at the event listener, wherein the first visual component is configured to continue a flow of execution independently of the event listener such that a second visual component is rendered while the event source schedules fetching of the data used to update the dependent component; and
rendering, within the dashboard, the first visual component comprising the dependent component upon the event listener receiving notification that the event source has finished fetching the data required to update the dependent component.

14. A computer program product as in claim 13, wherein the rendering of the updated dependent components having corresponding registered event listeners occurs asynchronously.

15. A computer program product as in claim 13, further comprising:
constructing a document object model (DOM) using the spreadsheet file; and
recursively creating the components using the DOM.

16. A computer program product as in claim 13, further comprising:
constructing an adjacency matrix using the spreadsheet file, the adjacency matrix having
labels of rows and columns correspond to nodes of a graph in which entries of 1 indicate that corresponding nodes are adjacent in the graph and entries of zero mean there is no edge between the nodes; and
recursively creating the components using the adjacency matrix.

17. A system comprising:
a client computing system comprising memory and at least one data processor; and
a server computing system remote from the client computing system comprising memory and at least one data processor;
wherein:
the client computing system receives a spreadsheet file and a separate dashboard structure file comprising metadata characterizing a dashboard from the server computing system;
the client computing system renders, using the spreadsheet file and the dashboard structure file, the dashboard, wherein the rendered dashboard includes a plurality of visual components, and wherein one or more of the plurality of visual components are adapted to provide visual representations of at least a portion of data from the spreadsheet file;
the client computing system analyzes the spreadsheet file and the dashboard structure file to determine at least one dependency between one or more cells in the spreadsheet file and a first visual component comprising the rendered dashboard;
the client computing system registers, for the at least one dependency, an event listener, wherein the event listener is paired with an event source comprising the one or more cells in the spreadsheet file, wherein the first visual component comprises a dependent component and the one or more cells comprise a dependee of the at least one dependency, and wherein the event listener is notified of an event from the event source when the dependee is changed;
the client computing system notifies the event source that data required for updating the dependent component in response to an event notification received at the event listener, wherein the first visual component is configured to continue a flow of execution independently of the event listener such that a second visual component is rendered while the event source schedules fetching of the data used to update the dependent component; and the client computing system renders, within the dashboard, the first visual component comprising the dependent component upon the event listener receiving notification that the event source has finished fetching the data required to update the dependent component.

* * * * *